March 2, 1943.  E. BOECKING  2,312,308

MOTION PICTURE PROJECTION MACHINE

Filed Dec. 30, 1939  4 Sheets-Sheet 1

INVENTOR
Ewald Boecking.
BY
Emery Varney Whittemore & Dix

March 2, 1943.  E. BOECKING  2,312,308
MOTION PICTURE PROJECTION MACHINE
Filed Dec. 30, 1939  4 Sheets-Sheet 2

INVENTOR
Ewald Boecking.
BY
Emery Varney Whittemore & Dix

March 2, 1943. E. BOECKING 2,312,308
MOTION PICTURE PROJECTION MACHINE
Filed Dec. 30, 1939 4 Sheets-Sheet 3

INVENTOR
Ewald Boecking
BY
Emery Varney Whittemore & Dix

March 2, 1943.  E. BOECKING  2,312,308
MOTION PICTURE PROJECTION MACHINE
Filed Dec. 30, 1939   4 Sheets-Sheet 4

INVENTOR
Ewald Boecking
BY
Emery Varney Whittemore + Dix

Patented Mar. 2, 1943

2,312,308

UNITED STATES PATENT OFFICE 2,312,308

MOTION PICTURE PROJECTION MACHINE

Ewald Boecking, Great Kills, Staten Island, N. Y.

Application December 30, 1939, Serial No. 311,756

12 Claims. (Cl. 88—18)

This invention pertains to machines or mechanisms for projecting motion pictures, and has particularly to do with improved means for obtaining greater efficiency of operation and for obtaining substantial elimination of flickering in the picture as viewed on a projection screen.

The invention relates to an improved motion picture projection machine which has improved efficiency in operation and which will project a picture with substantially no flicker that is noticeable to the eye.

The question of flicker in motion pictures as projected on a projection screen has been a very difficult question, and the elimination of this disadvantage to the eyesight has been a problem that has not been satisfactorily solved heretofore.

The source of flicker in projected pictures has been found to be in either the original photograph, or in the making of the multiple prints from the negatives, or in the projecting machine and its operation. From recent investigation it is believed that the greater amount of flicker, at least the flicker that may be perceived by the eye, develops during the projection of the motion picture. There is only a small amount of flicker developed during the taking of the original photograph, or developed during the preparation of the several prints.

Investigations also indicate that any slight flicker may be developed in the film during the photography by (a) Light setting of the camera; (b) irregularity of camera motion probably due to the motor system; (c) negative film; or (d) development of the film.

In making a plurality of prints from a negative, a small amount of flicker may be developed by (a) Motion of the film passing through the printing machine; (b) the transfer of the picture on to the positive film; (c) irregularities of the lamp operation; or (d) development of the printed film.

In the projection of the picture by the projection machine, there are several points where the flicker may develop. These points are as follows: (a) Undesired mechanical movements in the projector due to bad adjustment and due to the wearing of the parts; (b) the socalled arc flickers of alternating or direct current arc lights for the projection of the picture; (c) alternating current arc flicker combined with shutter interruption flicker. This gives what is called a "stroboscopic" flicker; (d) interruption of the projecting light by the shutter which gives a flicker that is known as an "inherent" flicker, and is usually due to the speed of operation of the shutter and to the exact point of cut-off of the projecting light by the closing sector of the shutter in respect to the opening in the shutter which permits the projecting light to pass to the screen, and due to the amount of projected light on the screen. As is well known, inherent flicker disappears when the shutter openings occur at a rate of about 106 or more per second.

The mechanism (a) of the projection machine, and (d) the inherent flicker are known and have been reduced to minimums, which are insufficient for the naked eye to fully perceive on the screen until the high intensity arc lamp with approximately five times more light were used and the inherent flicker again became objectionable.

Heretofore, the main source of flicker in the projected picture has been due to the use of the high intensity lamp which increased the inherent flicker and due to out of phase relationship between picture and shutter movement frequency relative to current and light pulsation frequency and, at low frequencies, to the use of the undesired portions of the alternations of the alternating current, or to the use of the undesired portions of pulsations in a direct current supply.

The improved invention herein is particularly directed to the substantial elimination of all of the noticeable flicker on the projection screen produced by the improper use of the projecting light in untimed or "out of phase" relation with the operation of the shutter that cuts off the projecting light to the picture screen at intervals during which the film is moved from one exposure to the next exposure, or for any other reason.

This particularly improved invention provides for projecting the picture on to the projection screen by using substantially all of the positive portions of the alternations of an alternating current supply in proper timed relation with the light interrupting shutter. Expressed in a negative way, the invention provides for interruptions of the projecting light during the presence of the negative portions of the alternations of an alternating current supply and during the low portions of the pulsations of a rectified direct current being used for the projecting light. Thus, it is desired in projecting the picture, to operate the shutter in phase with the positive portions of the alternations of an alternating current and the maximum portions of the pulsations of a direct current obtained by the rectification of an alternating current.

The stroboscopic flicker is now being overcome by the improved structure herein presented and the inherent flicker is substantially eliminated by this novel structure. These advantages may be obtained in any desired manner, such as by the preferred manner herein disclosed, which is to increase the number of shutter interruptions of the projecting light in the preferred instance herein, by one-quarter. Preferably this is accomplished by employing a five-blade shutter running at one-fifth of the alternating current cycles, or a two-blade shutter running at one-half of the alternating current cycles; or a one-blade shutter running at a rate equal to the number of alternating current cycles, the driving of the shutter being in timed relation with an intermittent mechanism which has two film pull downs in what will be referred to herein as one of its cycles of operation, that is, its cycle while the shutter intercepts the light beam five times. Each of the two pull downs occurs at one of the five beam interceptions of the shutter.

Another feature of this invention is to provide improved parts of a motion picture projection machine and to have those parts operate in new and novel manner so that the positive portions of the projecting light supply are used thereby obtaining substantially flickerless picture projection. The negative and minimum portions of a projecting light at low frequencies such as 60 cycles are preferably not employed in the projection of the picture and the shutter is provided to intercept these portions so that they do not reach the screen.

A further feature of this improved invention is to provide novel adjusting apparatus so that the running conditions of the machine may be modified so as to substantially always obtain the maximum value of the projecting light.

Figures 3, 4, 5, 6:
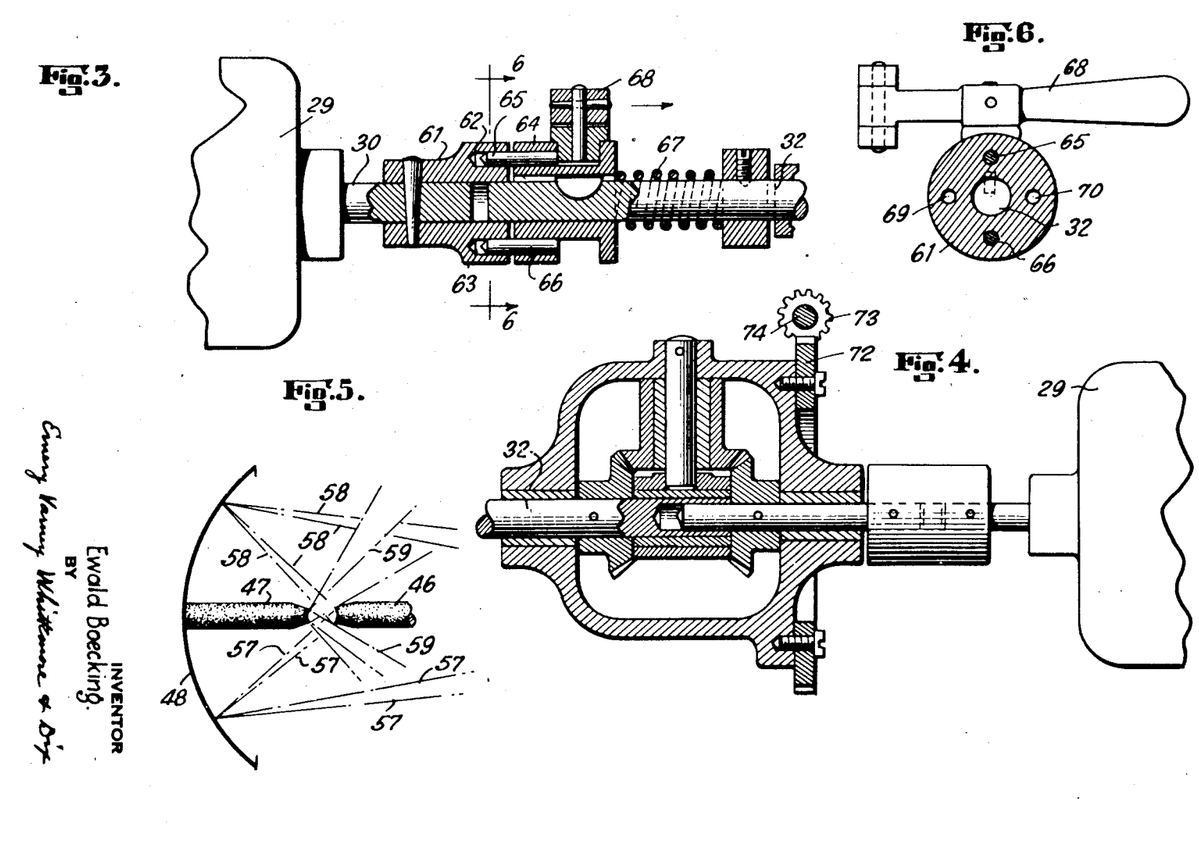
Fig. 3 illustrates one type of coupling between the driving motor and the mechanism for operating the shutter and for moving the film through the machine whereby the shutter may be adjusted to proper phase relation with the lighting supply.
Fig. 4 represents another type of coupling for adjusting the shutter in phase relation with the projecting light supply.
Fig. 5 is a diagrammatic view of an arc light and reflector for producing the projecting light and indicating the reflection of the positive and negative portions of the arc light alternating current supply.
Fig. 6 is a view taken on the line 6—6 of Fig. 3 showing the coupling and the handle.

Thus, it is to be noted that with the projecting light operating on alternating current, the actual light which reaches the projection screen is that obtained from the positive portion of each cycle or an alteration of the current supply, and the blocking off of the projecting light to the screen in order to change from one picture frame to the next, and for other purposes, is done during the negative portion of each cycle of an alternation of the current supply. This will be particularly apparent when reviewing the detailed description of Fig. 5. This feature may be indicated in general at this point by stating that the light issuing from the forward or right-hand carbon in Fig. 5 is practically all reflected to the film gate and from there to the screen, while the light issuing from the back or left-hand carbon is not all reflected to the projection screen as will be noted by the stray beam lines. The light issuing from the right-hand carbon is produced by the positive portion of any alternation of the alternating current supply, and the light issuing from the left-hand carbon is produced by the negative portion of the current alternation of a cycle.

It has been discovered that most of the socalled flickering of a picture on a projection screen, as noted by the observer in viewing motion pictures, is caused by the hit or miss use of the positive or negative portions of the projecting light, and by the ill timing of the shutter with the positive portions of the alternations, or the maximums of the pulsations in the current supply.

Heretofore in motion picture projection machines the projecting light is usually an ordinary incandescent bulb operating upon an alternating current circuit or an arc light operating upon direct current, it having been found that arc lights operating on the common 60 cycle alternating current produce so much flicker at the standard projection and shutter speeds as to be unusable. Substantially 80 per cent. of the projection machines of today employ alternating current for the projecting light and for the power for operating the mechanism of the machine. The other 20 per cent. of the machines employ direct current, which has usually been transformer or rectified from an alternating current circuit. Usually transformed or rectified currents have pulsations therein.

In obtaining as much light as possible from an incandescent bulb or an arc light, reflectors (Fig. 5) are employed to concentrate the light in the projection machine at a point known as the "film gate," in front of which the film is intermittently moved as it passes through the machine.

There is also provided in a motion picture projection machine a shutter which cuts the light off from the projection screen at intervals so that the film may be moved intermittently from one frame or exposure to the next frame or exposure. Usually the film is moved from one frame to another at the rate of twenty-four changes per second. This rate is a standard rate at this time, and will hardly be changed as practically all moving picture cameras, film printing machines, and projecting machines are manufactured and geared to operate at this rate.

By constructing and operating the improved projection machine so that the shutter interrupts the projecting light during the time when the negative side of the alternation of the alternating current supply is reflected, and permits the light to pass to the projection screen during the time when the positive portion of an alternation is being reflected to the film gate, then the maximum light upon the screen will be obtained without any substantial flicker that is noticeable to the eye.

The invention herein provides a novel type of motion picture projection machine in which the shutter operation is synchronized with the frequency of the light pulsations and preferably also which takes advantage of the positive portion of the light supply for the projection of the picture on the projection screen.

In the present day, motion picture projection machines are started by throwing the full power supply on at once. This creates a very heavy load on the driving motor and there is a slipping of the motor rotor so that the shutter slips out of proper time or phase relation with the alternation or pulsations of the current supply for the projecting light. Improved means have been herein provided for adjusting the driving mechanism so that the shutter and the means for moving the film through the machine may be placed in proper relation to take advantage of the projection of the positive portions of the projecting light to obtain the most effective non-flickering picture projection.

Other features, advantages and objects of the invention herein will be appreciated by the reading of the detailed description.

An illustrative embodiment of the improved mechanism is shown herein partly in diagrammatic form, wherein.

For the purpose of more readily understanding the detailed description, the following may be noted:

A motion picture projection machine is comprised of an intermittent mechanism which moves the film step by step, or exposure by exposure, through the machine and in front of a projecting light beam. The light beam extends from the projecting light, which is powered from an alternating current, or a direct current source, and passes through condensing lenses or over reflectors to part of the machine known as a film gate which has an opening therein that is the size of one exposure or frame in the film. After the light passes through the film, it passes through a series of lenses and from there to the projection screen located on the stage of a theatre, or to a screen on the wall of a home, or the like. In the present day apparatus the projecting light may be an incandescent lamp, or it may be an arc lamp, but in either instance the source of projecting light has associated therewith a reflector which assists in concentrating the light beam on the film gate.

With the moving of the film through the machine each exposure is quickly moved in front of the opening in the film gate where it stops a moment and is then pulled down or moved beyond the gate to allow the succeeding exposure to be moved to the position in front of the opening in the film gate. This opening is usually known as the aperture opening.

In this type of intermittent picture projection machine a suitable cover, interrupter or shutter means is provided for interrupting the beam of light at a time when the picture frame or exposure is moved to or from the aperture opening. Thus, there is no blurring on the screen due to the movement of the film through the projection machine. This means for interrupting the projecting light beam is usually known as a shutter. Shutters are provided in several forms. One form is an oscillating type that moves in and out of the projecting light beam. Another form of shutter is an annular shutter which is provided with one or more blades so that as the shutter is rotated the blades cut the projecting light beam at the proper time. Another type of shutter is that of two rectangle half portions, or other form, which are oscillated towards each other and intersect the light beam. Another form of shutter is one of barrel formation which has two diagonally opposite openings and is rotated in front of the film gate opening in the light beam.

It will be understood, when referring broadly to the shutter, that any one of these forms of shutter may be employed. A shutter cycle is made up of two parts—the interrupting or blade part and the opening part. This shutter cycle may be considered as extending from the front edge of one blade, across that blade, and across the succeeding opening to the beginning of the next blade. In the form of shutter which simply oscillates to interrupt the projecting light, the shutter cycle may be considered from the starting of the cutting of the projecting light and during the time of the interruption of the projecting light, and the time when the shutter is moved out of the projecting light and again brought to the point of beginning to cut the projecting light.

The movement of the film from one exposure to the next must be in time or phase relation with the operation of the shutter.

The film is moved by a mechanism known as an intermittent. Part of this mechanism has a quick movement and is then brought to a stop and then again operated to move the film. In most intermittents, and there are several forms, there is provided a guiding element and a moving element. Herein an intermittent cycle will be used to mean two pull downs when the shutter operates five cycles or interceptions.

Practically all cameras and projection machines are now manufactured to move twenty-four frames per second of the film through the projecting light.

It will be understood that the motion picture projection machine herein referred to may be any of the machines which project 8 mm. or 16 mm. or 35 mm. or other widths of film.

In referring to the power source for the projecting light mention has been made of an alternating current and the use of the most efficient part thereof. The details of this feature will be found in connection with Figs. 7 and 8 which are described below.

In cases where alternating current is employed for the projecting light, and the driving mechanism is operated by an alternating current motor, the invention herein provides an adjusting coupling so that, should the alternating current driving motor slip from one pole to another in starting, the coupling mechanism may be adjusted so that the shutter is not interrupting the projecting light beam at the time a positive portion of an alternation is being projected.

Referring now to the drawings which diagrammatically illustrate the essential parts of a motion picture projection machine, a motion picture film, 15, is drawn from its source of supply by a sprocket, 16. This film is then moved by any suitable means, such as a lower sprocket 17, through a film gate composed of a front plate 18 and a rear plate 19. After the film leaves sprocket 17 it passes to a take-up reel (not shown). The film may be threaded through the gate plates 18 and 19 in any satisfactory manner, usually plate 19 is stationary in the machine and plate 18 is capable of being oscillated and closed after the film has been threaded in position.

Plates 18 and 19 of the film gate are provided with openings to permit the light beam 20 to pass therethrough to lenses 21, and from the lenses to a projection screen mounted on the stage, or wall of a home or the like. The opening in plate 18 is known as aperture opening 22. This opening defines the size of the light beam which actually passes through the film and on to the lens system 21.

In the apparatus selected for the preferred form of example of incorporation of this invention, there is provided a rotating shutter 23 which has five blades, 24, 25, 26, 27, and 28. This shutter is so mounted that each blade cuts the light beam 20 as the blade passes in front of the aperture opening 22. The shutter may be mounted in any desired location so long as it cuts the light beam before it actually reaches the projection screen. Practically, the shutter is mounted on the projection machine and usually is mounted near the plate 18 of the film gate. The shutter may be driven in any suitable manner as by a motor 29 through shaft 30, coupling 31, shaft 32, spiral gears 33 and 34, and shaft 35.

The means for pulling the film 15 between the gate plates 18 and 19 may be of any suitable construction, and in this instance is an intermittent mechanism comprising a guiding element 37, a moving element 38, and a wheel 39 mounted on shaft 40 that carries the intermittent sprocket 17. This intermittent mechanism, in this instance, is driven by motor 29. In this particular example the continuously moving part 37 of the intermittent mechanism, it will be noted, is mounted on the same shaft that carries the shutter 23. The time relation between the intermittent movement of shaft 40 and the time when any one of the blades of shutter 23 cuts the light beam 20, is originally adjusted in the assembly of the machine.

Figure 1:
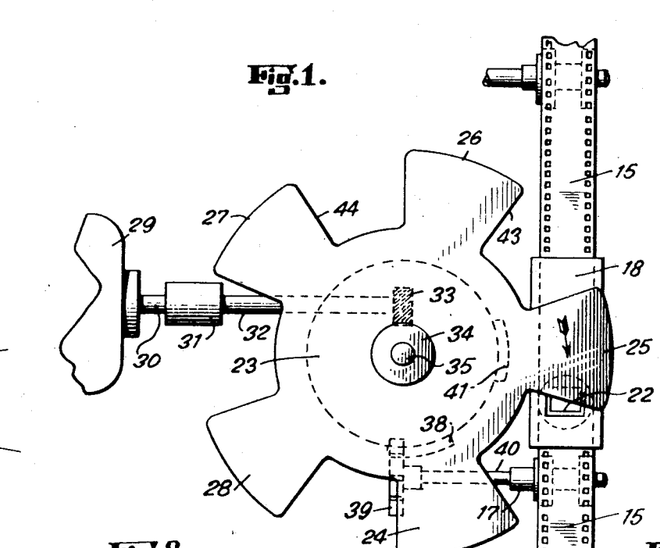
Fig. 1 is an enlarged view of portions of a motion picture projection machine diagrammatically indicating a film, a shutter, and means for driving the same.
Figure 2:
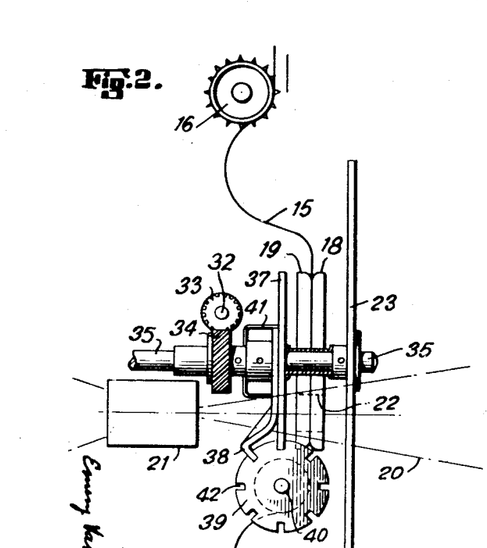
Fig. 2 is a side view of Fig. 1 from the left-hand side, without the motor and the coupling being shown.
Figures 13, 14:
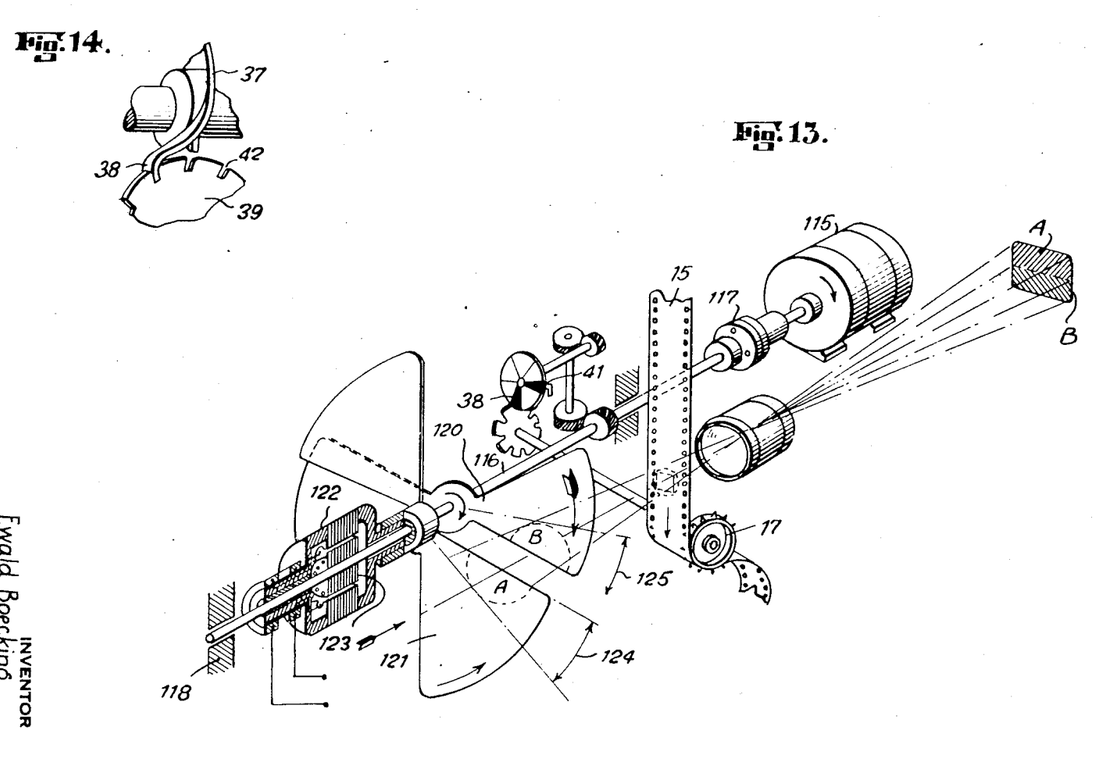
Fig. 13 is a modified form of the use of two shutters on the same side of the film whereby the shutters are driven in opposite directions by two synchronous motors with one means for adjusting to place the shutters in proper phase relation with the alternating current supply for the projecting light.
Fig. 14 is an enlarged perspective view of cam 38 shown in Fig. 1.

In this example of the incorporation of the invention herein, the guide member 37 of the intermittent is provided with two moving elements 38 and 41 (Figs. 1, 2, and 14). These elements, as will be particularly noted in Fig. 2, operate in the slots 42 of wheel 39, and the cam construction of moving elements 38 and 41 require the wheel 39 to be moved to a new position quickly. The guide element 37 is cut away, in this instance, at the portions behind the moving elements 38 and 41. During any complete rotation of the guide element 37 there are two operations of the intermittent shaft 40 caused by elements 38 and 41. This creates two pull downs of the film during one cycle of operation of this intermittent mechanism. The cams or moving elements 38 and 41 may be located at any desired positions on the guide element 37 so long as they move the wheel 39 and shaft 40, and consequently the film, during a time when one of the blades of the shutter cover the aperture opening 22.

For example, these moving elements may be positioned on guiding element 37 so that the intermittent moves the film when blades 25 and 27 cover the aperture opening 22. This arrangement is not a fixed arrangement for the film may be moved when blade 25 covers the aperture 22, and may again be moved when blade 26 covers the aperture opening. The reason for this flexibility of arrangement of the intermittent having two pull downs during one cycle of the intermittent mechanism will be noted later when considering the power source of the light supply.

Figures 11, 12:
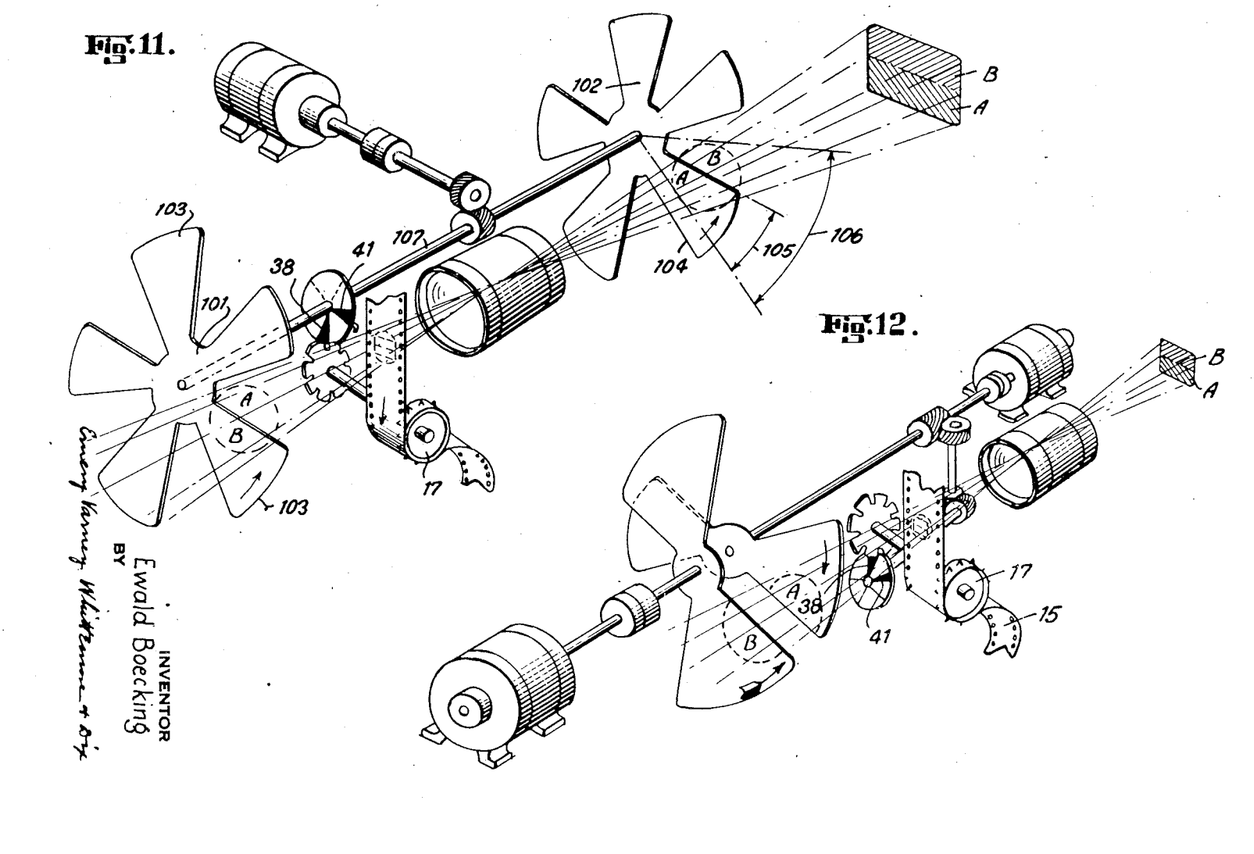
Fig. 11 is a perspective view of the film and its driving mechanism with two shutters positioned on opposite sides of the film and the projecting light lenses.
Fig. 12 is a modified form of use of two shutters for intercepting the light beam and both being mounted on the same side of the film in respect to the lenses.

As noted above, the shutter blade cycle constitutes the width of a blade and the width of the succeeding opening. For instance, on the five-bladed shutter, as indicated in Fig. 1, a shutter cycle begins with the front edge 43 of blade 26 and extends to the front edge 44 of blade 27. It is quite usual, in shutter construction, to have the width of the blade substantially equal to the width of the following opening space. This, however, may be modified to a very considerable extent. In fact, the shutter blades may be constructed so that their widths will be somewhere between 8 and 55 degrees of a 360 degree circumference. Usually this width is measured along a radius of that part of the shutter blade which passes through the center of the aperture opening 22. The intermittent is so constructed that the time required for the movement of the film from one frame to the next is very small. When a single bladed shutter is employed the width of the blade is increased proportionally to the increased speed at which the shutter is driven. The speed of movement of that shutter needs to be quite high so as to eliminate the flicker and other disadvantages. While the width of the shutter blades of a five-bladed shutter may fall between 8 and 55 degrees, it is found that the blade widths of most of such shutters are somewhere between 18 and 40 degrees. The preferred width of each blade of a five-bladed shutter is, approximately, 28 degrees. The widths of a two-blade shutter may be between 20 degrees and 137 degrees, and the width of a single blade of a one-bladed shutter may be between 40 degrees and 275 degrees. A shutter may have one blade or two blades, or 5 blades. The speed of operation of shaft 35 is to be set so that there will be a proper interruption of the projecting light beam when the film is being moved from one exposure to another. For a five-bladed shutter the shutter and intermittent drive member may be mounted on a common shaft and for a shutter having a different number of blades a suitable gear drive relationship between the shutter shaft and the intermittent motivating shaft may be established, as shown in Figs. 12 and 13.

Referring now to Fig. 5, there is illustrated, in diagrammatic form, a light source such as an arc composed of a right-hand or positive carbon 46, and a left-hand or negative carbon 47. Properly adjusted with respect to the arc is a reflector 48 which reflects the light's rays to form light beam 20 (Fig. 2).

As indicated previously, one of the features of this invention is to provide for the use of the positive portion of one cycle of an alternating current. For a clear understanding of the cycle or alternation of an alternating supply, there is provided, in Fig. 7 hereof, the usual representation of a cycle which begins at a zero line 49, and traces to a point 50 which is a maximum, and then decreases to the point 51 which is on the zero line 49. This portion of the cycle or alternation constitutes the positive portion 52. As this alternating current power passes through the zero line at 51 it forms a negative portion 53 with a maximum point 54 and then this negative portion decreases to the zero line and crosses the same and starts another positive cycle at the point 55. This figure thus shows the one complete alternation or cycle of an alternating current supply.

Figures 7, 8:
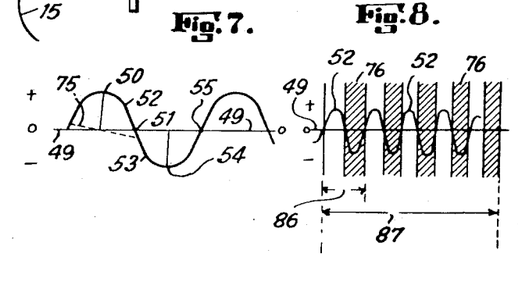
Fig. 7 is a diagrammatic figure of an alternating current cycle or alternation.
Fig. 8 is a diagrammatic showing of an alternating current having negative portions of the cycles shown in section to denote that the shutter blade prevents that part of the light from reaching the projection screen.

It will be noted that the cycle or alternation just explained is positive in respect to the zero line 49, and then becomes negative with respect to this zero line. In Fig. 8 the dark portions 76 indicate when the blade of a shutter cuts off the projecting light beam from the screen, and shows that the positive portions 52 of the cycle or alternation are free to pass through the shutter to the projection screen. It will be noted in this Fig. 8 that one cycle of alternation is indicated at 86 and that one-half of the cycle does not reach the screen. The cycle of the intermittent is shown in this figure at 87.

It is desired in the invention herein when using an arc lamp at low current frequencies to employ only the positive portions of each alternation for the projection of the picture. Thus, the positive portion is permitted to be reflected by reflector 48 and passes to gate plate 18 of the film gate and through opening 22 to the lenses 21 and from there to the projection screen. It is desired in this invention to have the positions of the blades of the shutter so that an opening in the shutter will be in front of aperture 22 when the positive portion 52 of an alternation is being reflected by reflector 48. Also, it is desired that one of the blades of shutter 23 shall be in front of the aperture opening 22 when the negative portion 53 of an alternation is dominant between carbons 46 and 47. The reason for this desire will be shown in Fig. 5 in which the carbon 46 reflects its light by rays 57 and 58 to the reflector 48 which redirects these rays to the gate plate 18. Thus, the positive portion of an alternation or cycle constitutes the maximum amount of light which can be used for the projecting light beam. The negative portion 53 of the cycle issues from carbon 47 and it will be noted that negative light rays 59 are not directed to the reflector 48 and therefore the reflected projecting light beam is of little value during the negative portion of the alternation or cycle. It is at this time of low light intensity that it is desired to have the blades of the shutter cut across the aperture opening and thereby prevent these negative portions from reaching the projection screen.

It will therefore now be noted that with an alternating current supply for the projecting light, either by the arc or incandescent lamp, there will be used only the positive portions of the alternations of the alternating current supply. If the power source for the projecting light is 60 cycles, which is usual in most localities, it is then desired to employ the type of shutter that will interrupt the projecting light 60 times per second. If the shutter is a single-blade rotating type, it will have to be rotated sixty times per second. If a rotating shutter with two blades is employed, then the shutter is rotated at the rate of thirty times per second. With a five-bladed rotating shutter, as indicated in the drawings herein, and when 60-cycle current is being used to power the projecting light, the shutter is rotated at one-fifth of the number of cycles, or twelve times per second.

In view of the fact that at the present time the starting of a motion picture machine is accomplished by throwing full power on to the driving motor 29, there are times when the rotor of this motor will slip a one-half cycle before it comes up to correct or full speed and the shaft 30 would then be driving shaft 32 out of the desired time and phase relation with the alternations in the projecting light power source, and the blades of the shutter would be cutting across aperture 22 when the positive portion 52 of the alternating current is dominant in the arc as shown in Fig. 5. In order to adjust this situation and to have the shaft 32 and thereby the intermittent mechanism and the shutter, driven in proper time and phase relation with the reflection of the positive portions of the alternating current, a suitable adjusting coupling is provided. In the form of adjustable coupling noted in Fig. 3, shaft 30 is provided with a driving element 61, which has openings 62 and 63 therein. Shaft 32 is provided with a driven element 64 which carries pins 65 and 66 which are received in the openings 62 and 63. The driven element 64 is slidably mounted on the shaft 32 against a suitable resilient means, such as spring 67. A suitable connecting means between shaft 32 and driven member 64 is provided so that there will not be relative rotation between shaft 32 and member 64. The type of connection selected is a Woodruff key which is mounted in shaft 32 and extends into a slot in driven element 64. A handle 68, is provided as noted in Fig. 6, so that driven element 64 may be backed off and allowed to reengage the driving element 61 so that pins 65 and 66 would engage openings 63 and 62 respectively instead of openings 62 and 63. With this adjustment accomplished the intermittent mechanism and the shutter will be driven in proper time and phase relation to the alternations of the projecting light power so that the positive portion of each alternation passes to the projection screen.

The foregoing description of the adjustable coupling above indicates that there would be a 180 degree movement of pins 65 and 66 in respect to the openings 62 and 63. This 180 degree movement is true when the driving motor 29 is a two-pole motor. If the driving motor 29 is a four-pole type of motor, then the pins 65 and 66 only need to be adjusted through 90 degrees instead of 180 degrees, and in that instance the additional openings 69 and 70 are provided in the driving element 61 mounted on shaft 30.

Another type of coupling for making the proper adjustment so that the positive portions of the alternating current of the projecting light may reach the screen, is indicated in Fig. 4 wherein there is provided a well known differential mechanism, preferably running in oil, and adapted to be rotated sufficiently by a gear 72 from a spiral gear 73, mounted on shaft 74 which leads to the exterior part of the projection machine for handy operation thereof. This differential gear is of the common type but permits a finer adjustment than the type of coupling shown in Fig. 3. The adjustment with the type of coupling shown in Fig. 4 allows for quick and accurate adjustment. In addition, accuracy is particularly desired so that the maximum of the positive portion of the light may be employed.

Under normal operations practically all of the positive portion of the light may be employed and the intermittent and the shutter are adjusted to give this result. Therefore all of the light above the zero line 49 would be employed. If the adjustment is not properly made, then the light would be less and it would be found that the shutter blades are not properly adjusted for their cut-offs and would be employing the light indicated by the dotted line 75 of Fig. 7, which shows most of the positive portion of a cycle and some overlap into the negative portion. By the use of the coupling noted in Fig. 4 the shutter drive may be adjusted so that the line 75 is returned to a position where it will coincide or register with the zero line 49.

The foregoing description has been directed to the operation of an improved projection machine using alternating current for both the projecting light and the motor which drives the mechanism.

In those instances where direct current is employed as the projecting light source, it has been found that this direct current is usually derived from rectifying alternating current, and in that case the direct current has been found to be pulsating, that is, there are high and low portions of the power above a zero line, such as zero line 49 in Fig. 7. In instances where these pulsations occur, it is desired that the maximum portions or parts of the pulsations are employed for the projecting light and that the minimums thereof shall be cut off from the screen. The type of coupling shown in Fig. 4 is very helpful in obtaining the proper adjustment so that the maximum parts of the direct current are usable. In this manner the flicker and loss of light caused by the low portions of the current supply is eliminated by this invention if the present type of projectors are used.

Here it may be noted that in any event the motor which drives the shutter is motivated by alternating current, preferably at 60 cycles, in order that the phase polarity of the current may be utilized with reference to the polarity of the motor to synchronize the operation of the shutter and intermittent with the light pulsations which are derived from the same current source, either alternating or rectified direct current. The current source may be of 60 cycle frequency or any multiple of the half frequency, that is 60, 90, 120, 150 cycles, and so on, as stated elsewhere herein, so that there may be synchronization on the half phases or crossings of the zero line for any of these frequencies if the motor is operated on 60 cycle current, or on any other multiple current cycle, as stated before.

Figure 9:
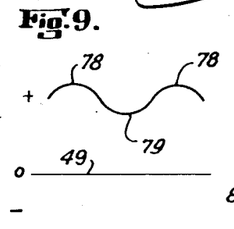
Fig. 9 is a showing of a pulsating direct current.
Figure 10:
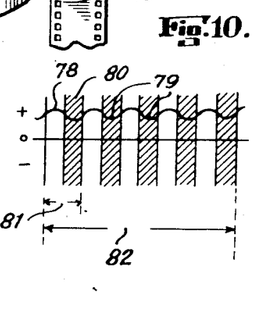
Fig. 10 is a diagrammatic showing similar to that in Fig. 8 except that it is applied to a pulsating direct current supply.

Referring now to Fig. 9, the pulsating direct current rectified from the alternating current is shown as having maximum points 78 and low points 79 at a distance above the zero line 49. With the use of this type of direct current it will be noted that the shutter is operating so that the maximums 78 are allowed to reach the projection screen while minimums 79 are intercepted by the blades of the shutters, as indicated by the hatched lines 80 of Fig. 10. It will be noted from the Figures 9 and 10 that the pulsations do not reach nor cross the zero line 49. In Fig. 10 a shutter blade cycle is indicated at 81, and a cycle of the intermittent and shutter shaft is indicated at 82 when the shutter is being moved one-fifth as fast as the sixty pulsations of the projecting light or at the rate of 12 R. P. S.

Referring now to Fig. 11 where there is shown diagrammatically, the use of two shutters, 101 and 102 so positioned that one cuts the projecting light beam before it reaches the film, and the other cuts the projecting light beam after the beam has passed through the film and through the lens system. These shutters are shown as five-bladed shutters and are usually employed with an alternating current of about 60, 90, 120, 150, 180, 210, 240, 270, 300, 360 cycles, or the like, although it is to be understood that single-bladed or two-bladed shutters may be employed. While the number of cycles have been recited they may be expressed as 60 cycles or additions of one-half of the standard 60 cycles, i. e., additions of 30, that is at 60 cycle frequency or of multiples of the half frequency (30) of 60 cycle current. As stated before, one reason for taking 60 cycle current as the basic drive is that it is practically universal and in almost all cases is kept so constant as to permit timepieces of great accuracy to be run directly from it; and another reason is that a shutter which is synchronized with 60 cycle current will make 120 light beam changes per second which is above the threshold (at 106 cycles) of inherent flicker. The speed is, however, low enough to prevent injury to the film by the intermittent. The object of the two shutters positioned as indicated is to intercept the projecting light simultaneously from different points of the diameter of the light, in this case from opposite points. It will be noted that one of the blades 103 of shutter 101 has cut one-half of the projecting light as indicated on the blade, that is B half; while blade 104 of shutter 102 has cut the A half of the projecting light as indicated. Thus, the total diameter of the projecting light beam, composed of halves A and B, is completely intercepted so that the screen would normally be dark, and for this reason the screen is shown cross-hatched. By cutting the diameter of the light beam from opposite points there is less time required in intercepting the full diameter of the light beam, and thus there is obtained a much longer length of time for the projecting light on to the projection screen. The time that a blade begins to cut a light beam and until it completely cuts the light beam, is known as the dead angle. By the use of double shutters as indicated in this figure, the dead angle is materially cut down or decreased as shown at 105 instead of the long dead angle 106 as shown where there is a single shutter.

In the system of locating a shutter on each side of the film it will be noted from the diagrammatic sketch of Fig. 11 that the width of the blades may thereby be reduced, or the same effect can be obtained by lengthening the elements 38 and 41 to move the film a little slower. It will also be noted that the shutters are driven in the same direction by a single shaft 107.

Referring now to Fig. 12 it will be noted that there is a modified form of use of the double shutter so as to gain the advantages of a small dead angle. In the structure shown both shutters are located on the same side of the film and preferably close together, and they rotate in opposite directions, as indicated by arrows. It will be understood that the two shutters operate close together and may be mounted either on one side of the lens or on the other side. Both shutters are driven preferably by synchronous motors and each is provided with an adjusting coupling of one of the forms indicated in either Figs. 3 or 4. If one synchronous motor with one coupling is provided, the shutters may be driven in opposite directions by the use of any suitable set of differential gears. It will be noted that the light beam is cut from opposite sides simultaneously and that the dead angle is greatly reduced. In this Fig. 12 each shutter is provided with two blades instead of five blades.

It is desired that the shutters should rotate in proper speed or in phase relation with respect to the cycles in the alternating current which powers the projecting light. In the instance of use of the two-bladed shutters they are to be rotated at thirty revolutions per second. Suitable driving means for operating the intermittent mechanism and therefore the movements of the film is derived, preferably, from one or the other of the motors provided for rotating one of the shutters.

Referring now to Fig. 13, another form of mechanism is shown for providing two shutters located close together on the same side of the film for interrupting the projecting light. A novel form of driving these shutters is indicated. The two shutters here shown for purposes of illustration are two-bladed shutters. In the structure herein a synchronous motor 115 is provided for driving shaft 116 through a suitable adjustable coupling 117. This shaft 116 extends to the left into a bearing 118. This shaft carries shutter 120 and rotates the same to the right at 1800 R. P. M.

The second shutter, 121, is mounted on a rotating field 122 which is part of a two-pole synchronous motor having windings to cause a 3600 R. P. M. speed, but which rotates in the opposite direction to the shaft 116. This shaft 116 carries a rotor 123 of the two-pole motor. This rotor is rotated at a speed of 1800 R. P. M. by shaft 116. With the rotor 123 going in one direction and the field 122 operating in the other direction at twice the speed, the actual operation of shutter 122 will be at 1800 R. P. M. in the reverse direction to shutter 120. It is understood that this arrangement can be reversed so that the four-pole motor drives the field and the two-pole motor drives the rotor. If there is any slipping in the four-pole driving motor when starting, the single adjusting means 117 will take care of the situation as there would be a 90 degree adjustment. The slipping of the small two-pole synchronous motor in this instance of use of double shutters would be 180 degrees and would therefore do no harm because the two-bladed shutter would still be 180 degrees apart.

Again, with this double-type of shutter operating so as to cut the projection light beam from different points, there is a small dead angle 124 with shutter 121, and angle 125 with shutter 120, thus saving up to approximately 33 per cent. light which is not cut off from the projection screen as against the single shutter operation. In the modified form shown in Fig. 13, the speed of the shutter blades is half the number of the alternations of the alternating current provided for the projecting light.

It is to be noted that the construction of sprocket 17 may be changed for different widths of films being used. For instance, when a 35 mm. film is going through the projection machine, sprocket 17 has 32 teeth. When a 16 mm. film is used, sprocket 17 has 8 teeth. These changes can be made in accord with the type of intermittent being employed.

It will also be noted that the shutters are to be driven at a speed that has a ratio to the number of cycles of the current employed for the projecting light. Assume that the power for the projecting light is 60 cycle alternating current, than a single bladed shutter will, in interrupting the projecting light sixty times per second, bear a one to one ratio with the cycles. If now the shutter is a two-bladed shutter then the ratio will be one-half to one. If a five-bladed shutter is employed than the ratio is one-fifth to one.

It will be particularly noted from the foregoing description that the improved apparatus herein permits the use of the maximum portions of the light of the power supplied for the projecting light beam, and that the mechanism of the projection machine is properly timed or placed in proper phase relation with the positive or maximum portions of the projecting light supplied, to employ the desired parts of the projecting light. In this manner one of the great disadvantages, i. e., flickering on the projection screen, is substantially eliminated insofar as the eye of the observer is concerned. This improved apparatus herein permits also the use of a direct current power supply known as "high intensity arc lamp" and substantially eliminates flickering on account of one-quarter more shutter interruptions as on all present projectors. In this case only the adjusting coupling may not be needed. This flickering has been a great disadvantage but is now overcome and permits many people to see motion pictures without detriment to the eyesight.

When the cycles of the projecting light supply are above 60, say 90, 120 or other high cycles as indicated hereinbefore, the width of an opening in the shutter is such that some of the negative portions of the cycles or alternations are allowed to pass to the projection screen, but under those conditions the speed of alternations is such that the end of positive carbon continues in a glow and does not fall to a "cooled down" condition before the next positive portion of the next succeeding cycle brings the end of the positive carbon again to glowing condition, and therefore the reflection of the desired light is obtained. Thus, the duration of the negative portion of a cycle is too short to be of particular detriment, as the positive carbon is always glowing. Therefore the use of the higher number of cycles gives a more continuous and effective beam for the projecting light, as the positive carbon is glowing substantially all the time, and the negative portions of the cycles have little or no effect. It will be noted that the loss of effectiveness of the positive portions is less as the number of cycles increases.

Also, as the cycles increase there will be no flickering if the width of each opening in the shutter between the blades is equal to the width of any other opening. This means that when an alternating current of a high number of cycles is being employed, (assuming the motor still to be synchronized at 60 cycles) that there will be positive and negative portions of the cycles pass to the projection screen, but that there will be no flickering if the number of the positive portions and the number of the negative portions which reach the screen are maintained equally, as they will be for multiples of half the frequency of 60 cycles on which the shutter motor is synchronized. Once having established the basic synchronization it will not matter if the frequency increases or decreases a certain amount because the shutter, intermittent and light pulsations will maintain the predetermined relationship and all will vary together in the same proportion.

It is usual with the two-blade and the five-blade shutters that the widths of the blades shall be equal. However, with the high number of cycles, the widths of the openings do not need to be the same as the widths of the blades, and thus, when there is an unlikeness between the widths of the openings and the widths of the blades, it is possible to maintain an equal number of positive portions or parts thereof and an equal number of negative portions or parts thereof of alternations which may pass to the projection screen through a single opening.

In designing a shutter it is desirable to know the usual cycles of the alternating current for the projection light as the width of the blades may be varied due to the requirements that each opening in the shutter should be of equal width to the other openings in the shutter, and that the widths of these openings be unlike as to the width of the blades. The idea is to maintain an equal number of positive portions and negative portions of the alternations, when there are a high number of cycles, that pass to the projection screen through each shutter opening.

The preferred form of apparatus shown and described herein is illustrative of the invention, and it is to be understood that modifications and changes therein may be made, but such modifications and changes are to be considered as being within the scope of the invention herein, as defined in the following claims.

What is claimed is:

1. In a motion picture projection apparatus adapted to eliminate inherent and stroboscopic flicker when projecting pictures at the standard projection rate of 24 frames per second and with a source of alternating power current having a frequency of 60 cycles per second or other multiples of half that frequency, which comprises, an intermittent for feeding the film, a light beam intercepting shutter synchronized with the power current to operate at 60 shutter cycles per second, means for projecting a beam of light having a pulsation frequency which is a multiple of half the 60 cycle frequency and in synchronism with the power current, and means for driving said intermittent to pull down the film on two of each five light beam interceptions of the shutter.

2. In a motion picture projection apparatus the combination of a light source emitting periodically varying light of a frequency which is two and one-half times the picture projection frequency, a shutter moving through the beam of light at a speed which is synchronized at unity with the light impulses, the shutter changes being above the frequency limit for inherent flicker and the intermittent speed being below the limit at which the film is injured, the shutter interceptions occurring during minor portions of the light impulses whereby the picture is projected by major portions only of the light impulses, and means for synchronizing the picture frequency for each two frames with each five light impulses and the shutter movements whereby a fixed relationship is maintained at all times.

3. In a motion picture projection apparatus the combination of a light source emitting periodically varying light of a normal frequency of 60 cycles per second, means for projecting pictures at a normal frequency of 24 frames per second, a shutter moving through the beam of light at the rate of 60 interceptions per second, and means for synchronizing the light variations and the shutter movement with the picture projection to maintain a fixed relationship at all times such that the beam of light is exposed by the shutter at least once for each picture projection and is interrupted by the shutter between each picture projection, the shutter interceptions being timed to occur during minor portions of the impulses whereby the picture is projected by major portions only of the light impulses.

4. In a motion picture projection apparatus the combination of means for projecting a light and driving a motor in phase synchronism at 60 cycles per second, a five-bladed shutter driven by the motor shaft at 12 revolutions per second, and means driven by the motor shaft for feeding film in two steps of one frame each while the shutter is making one revolution, the film being moved each time it is fed while a shutter blade is intercepting the beam of light.

5. Apparatus as set forth in claim 4 which further includes means between the drive motor and shutter for varying the drive position during operation whereby to project the picture with maximum portions only of the phases and to maintain this adjustment.

6. In a motion picture projection apparatus the combination of a light source emitting periodically varying light of a frequency which is two and one-half times or some other multiple of half two and one-half times the picture projection frequency, shutter means moving through the beam of light at a speed which is synchronized at unity with the light impulses, the shutter changes being above the frequency limit for inherent flicker and the intermittent speed being below the limit at which the film is injured, the shutter interceptions occurring during minor portions of the light impulses whereby a picture is projected by major portions only of the light impulses, and means for synchronizing the picture frequency for each two frames with each five light impulses or some other multiple of half five light impulses and the shutter movements whereby a fixed relationship is maintained at all times.

7. In a motion picture projection apparatus the combination of a light source emitting periodically varying light of a frequency which is two and one-half times or some other multiple of half two and one-half times the picture projection frequency, shutter means moving through the beam of light at a speed which is synchronized at unity with the light impulses, the shutter changes being above the frequency limit for inherent flicker and the intermittent speed being below the limit at which the film is injured, the shutter interceptions occurring during minor portions of the light impulses whereby a picture is projected by major portions only of the light impulses, and means for synchronizing the picture frequency for each two frames with each five light impulses or some other multiple of half five light impulses and the shutter movements whereby a fixed relationship is maintained at all times, said shutter means comprising two shutters moving in opposite senses with respect to said beam whereby to shorten the period of cutting across the beam.

8. In a motion picture projection apparatus the combination of a light source emitting periodically varying light of a frequency which is two and one-half times or some other multiple of half two and one-half times the picture projection frequency, shutter means moving through the beam of light at a speed which is synchonized at unity with the light impulses, the shutter changes being above the frequency limit for inherent flicker and the intermittent speed being below the limit at which the film is injured, the shutter interceptions occurring during minor portions of the light impulses whereby a picture is projected by major portions only of the light impulses, and means for synchronizing the picture frequency for each two frames with each five light impulses or some other muliple of half five light impulses and the shutter movements whereby a fixed relationship is maintained at all times, said shutter means comprising two shutters moving in unison in the same direction but located on opposite sides of the film.

9. In a motion picture projection apparatus the combination of a light source emitting periodically varying light of a frequency which is two and one-half times or some other multiple of half two and one-half times the picture projection frequency, shutter means moving through the beam of light at a speed which is synchronized at unity with the light impulses, the shutter changes being above the frequency limit for inherent flicker and the intermittent speed being below the limit at which the film is injured, the shutter interceptions occurring during minor portions of the light impulses whereby a picture is projected by major portions only of the light impulses, and means for synchronizing the picture frequency for each two frames with each five light impulses or some other multiple of half five light impulses and the shutter movements whereby a fixed relationship is maintained at all times, said shutter means comprising two shutters moving at the same speed in opposite directions on the same side of the film.

10. In a motion picture projection apparatus the combination of a light source emitting periodically varying light of a frequency which is two and one-half times or some other multiple of half two and one-half times the picture projection frequency, shutter means moving through the beam of light at a speed which is synchronized at unity with the light impulses, the shutter changes being above the frequency limit for inherent flicker and the intermittent speed being below the limit at which the film is injured, the shutter interceptions occurring during minor portions of the light impulses whereby a picture is projected by major portions only of the light impulses, and means for synchronizing the picture frequency for each two frames with each five light impulses or some other multiple of half five light impulses and the shutter movements whereby a fixed relationship is maintained at all times, said shutter means comprising two shutters moving at the same speed in opposite directions on the same side of the film, one of the shutters being driven from a motor formed with the shaft of the first shutter and turning at twice the absolute speed with reference to that shaft.

11. In a motion picture projection apparatus the combination of a light source emitting periodically varying light of a frequency which is two and one-half times or some other multiple of half two and one-half times the picture projection frequency, shutter means moving through the beam of light at a speed which is synchronized at unity with the light impulses, the shutter changes being above the frequency limit for inherent flicker and the intermittent speed being below the limit at which the film is injured, the shutter interceptions occurring during minor portions of the light impulses whereby a picture is projected by major portions only of the light impulses, means for synchronizing the picture frequency for each two frames with each five light impulses or some other multiple of half five light impulses and the shutter movements whereby a fixed relationship is maintained at all times, and means for adjusting the phase relationship between the shutter and the light source.

12. In a motion picture projection apparatus the combination of a light source emitting periodically varying light of a frequency which is two and one-half times or some other multiple of half two and one-half times the picture projection frequency, shutter means moving through the beam of light at a speed which is synchronized at unity with the light impulses, the shutter changes being above the frequency limit for inherent flicker and the intermittent speed being below the limit at which the film is injured, the shutter interceptions occurring during minor portions of the light impulses whereby a picture is projected by major portions only of the light impulses, means for synchronizing the picture frequency for each two frames with each five light impulses or some other multiple of half five light impulses and the shutter movements whereby a fixed relationship is maintained at all times, and means for resetting said shutter and film movements with reference to said light impulses if they should get out of the desired synchronism, said means including a drive motor driven in parti-phase synchronism with the light impulse frequency, and a device for adjusting the motor and the motor driven parts after the motor has been started.

EWALD BOECKING.